United States Patent
Ishiwatari et al.

[11] Patent Number: 5,958,164
[45] Date of Patent: Sep. 28, 1999

[54] METHOD OF MANUFACTURING THERMOPLASTIC POLYESTER RESIN FOAM BY EXTRUSION

[75] Inventors: Susumu Ishiwatari, Nara; Masahiro Tsubone, Koga; Takaaki Hirai; Masahiro Shindo, both of Tenri; Kiyoshi Yoshioka; Nobuyuki Tsujiwaki, both of Kitakatsuragi-gun, all of Japan

[73] Assignee: Sekisui Kaseihin Kogyo Kabushiki Kaisha, Osaka, Japan

[21] Appl. No.: 08/579,271

[22] Filed: Dec. 27, 1995

[30] Foreign Application Priority Data

Dec. 27, 1994 [JP] Japan .................................. 6-339666
Feb. 28, 1995 [JP] Japan .................................. 7-066977
Aug. 24, 1995 [JP] Japan .................................. 7-240572

[51] Int. Cl.$^6$ .......................... B29C 47/06; B29C 47/40; B29C 47/50; B29C 47/76
[52] U.S. Cl. .......................... 156/78; 156/94; 156/244.11; 156/244.18; 264/37.32; 264/45.9; 264/51; 264/54; 264/101; 264/146; 264/151; 264/211.23
[58] Field of Search .......................... 156/78, 94, 244.18, 156/244.19, 244.21, 244.24, 244.27, 245, 267, 307.1; 264/36, 45.9, 50, 51, 53, 54, 101, 102, 146, 151, 211.23, 211.24, 321, 565, 37.1

[56] References Cited

U.S. PATENT DOCUMENTS

| | | | |
|---|---|---|---|
| 3,733,381 | 5/1973 | Willette et al. | 264/46.1 |
| 3,795,633 | 3/1974 | Golovoy et al. | |
| 4,002,581 | 1/1977 | Dolce . | |
| 4,034,013 | 7/1977 | Lane | 524/513 |
| 4,143,001 | 3/1979 | Raab et al. . | |
| 4,185,060 | 1/1980 | Ladney, Jr. | 264/54 |
| 4,255,295 | 3/1981 | Regnault et al. . | |
| 4,258,153 | 3/1981 | Yomamoto et al. | 525/397 |
| 4,344,874 | 8/1982 | Akagi et al. | 524/296 |
| 4,391,971 | 7/1983 | Massey et al. | 528/481 |
| 4,863,652 | 9/1989 | Chang | 264/101 |
| 4,883,840 | 11/1989 | Cartasegna | 525/146 |
| 4,954,568 | 9/1990 | Gelles et al. | 525/64 |
| 5,000,991 | 3/1991 | Hayashi et al. | 264/46.8 |
| 5,026,790 | 6/1991 | Tyrell et al. | 525/438 |
| 5,300,543 | 4/1994 | Ebert et al. . | |
| 5,362,763 | 11/1994 | Al Ghatta et al. . | |
| 5,391,582 | 2/1995 | Muschiatti et al. . | |

FOREIGN PATENT DOCUMENTS

| | | |
|---|---|---|
| 0435023 A2 | 7/1991 | European Pat. Off. . |
| 60-54850 | 12/1985 | Japan . |
| 8802113 | 3/1990 | Netherlands . |
| WO 90/10667 | 9/1990 | WIPO . |
| WO 95/15257 | 6/1995 | WIPO . |

OTHER PUBLICATIONS

Patent Abstracts of Japan, vol. 5, No. 135, Mehod of and Apparatus for Producing Thermoplastic Resin Foamed Body.

Plastics Engineering Handbook, Fourth Edition, p. 201, 1976.

*Primary Examiner*—Richard Crispino
*Attorney, Agent, or Firm*—Nikaido Marmelstein Murray & Oram, LLP

[57] ABSTRACT

A thermoplastic polyester resin is fed into a twin extruder, wherein a resin is heated for melting, thereby removing moisture in the resin by evacuating and sucking from a vent port thereof, injecting a foaming agent into the resin to which is pushed out as a foaming sheet and, after that, forming the foaming sheet which is divided into a forming body and a trimming loss, whereby the trimming loss is crushed to obtain crushed materials which are provided so as to put the materials into the twin extruder as collection materials and recycle them.

18 Claims, 3 Drawing Sheets

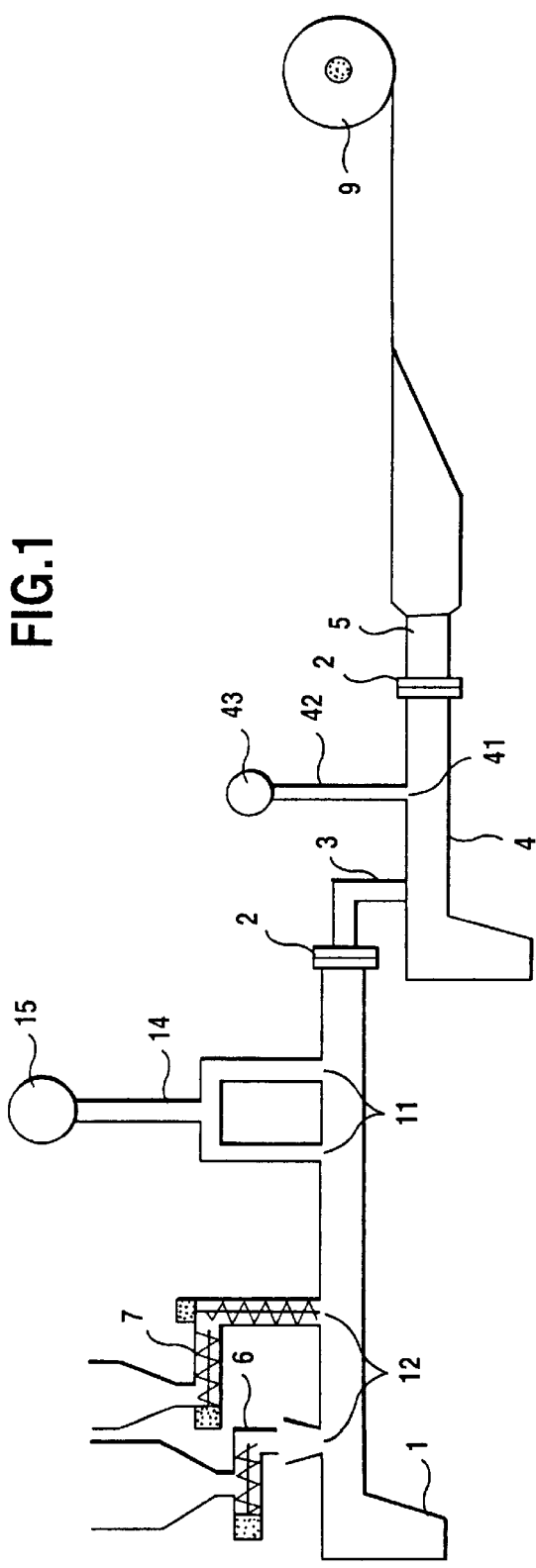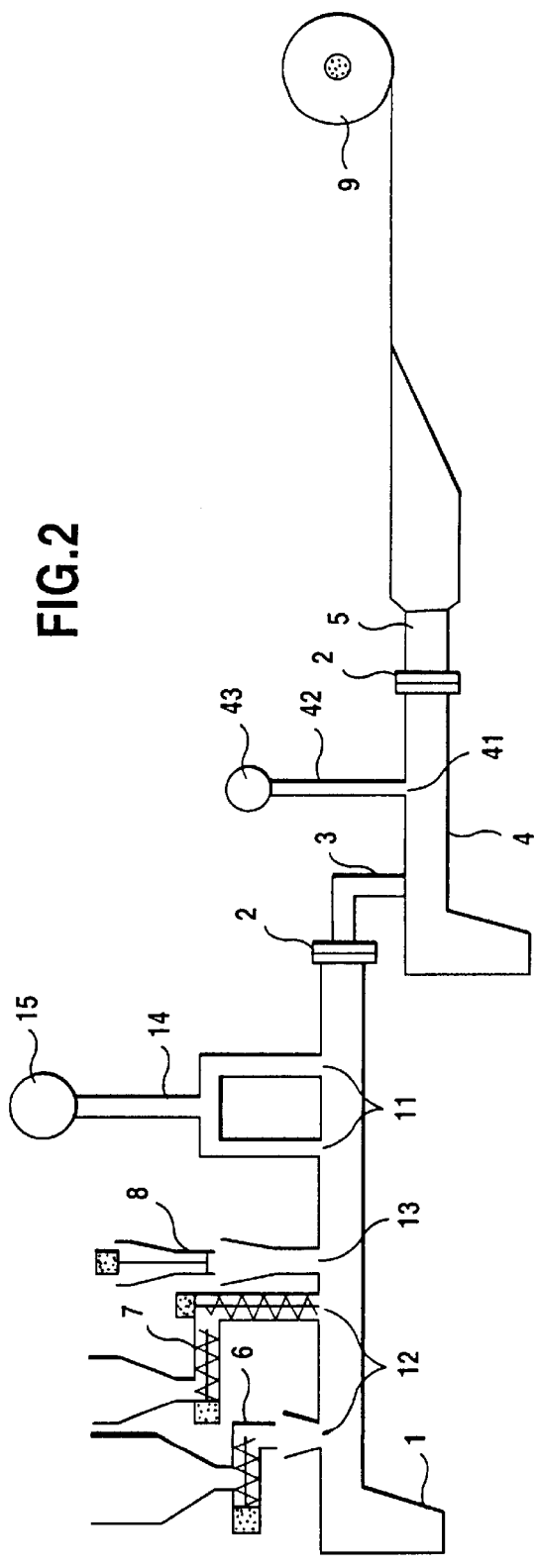

METHOD OF MANUFACTURING THERMOPLASTIC POLYESTER RESIN FOAM BY EXTRUSION

TECHNICAL FIELD

The present invention relates to continuous manufacturing method and manufacturing apparatus of thermoplastic polyester resin foam. More particularly, it relates to a continuous manufacturing method and a manufacturing apparatus of foam characterized by reusing recovered material made of recycled thermoplastic polyester resin.

BACKGROUND OF THE INVENTION AND RELATED PRIOR ART

Thermoplastic polyester resin is an engineering plastic which is excellent in heat resistance, chemical resistance and weather resistance, and also superior in tensile strength and other mechanical properties. This resin is mass produced by blow forming or the like and used widely as liquid containers. The thermoplastic polyester resin is a crystalline resin, so that it is difficult to make resin foam, but it is extruded and foamed by adding a crosslinking agent as disclosed in the U.S. Pat. No. 5,000,991 to obtain a foamed sheet, and this foamed sheet is heated and formed into a container, and is recently used as a heat resistant container usable in heating and cooking in a microwave oven.

Such containers find no applications after the contained merchandise is consumed. The system for recycling a huge quantity of used containers has been regulated by law in various nations in relation to environmental problems. In this background there is a mounting need for effectively reusing the recycled containers.

Moreover, the thermoplastic polyester resin has a moisture absorbing property, and when the resin containing moisture is put in an extruder heated to high temperature, it is hydrolyzed and deteriorates, and therefore it must be dried to 300 ppm or less. For example, in the specification of W095/15257, the trimming loss of thermoplastic polyester resin foamed sheet is ground and reused. This ground material is dried preliminarily. In this drying process, usually, the ground material is put in a dryer and is heated for some time while circulating dry air. The ground material of foam is bulky and a large dryer is needed, and the heating time must be kept for at least several hours, and hence this drying process is complicated, and omission of this drying has been expected. Besides, the dried state varies significantly, and it leads to fluctuations of the supply materials.

As disclosed in Japanese Patent Publication (TOKKYO KOKOKU) No. 60-54850, it has been known to fuse polystyrene resin, evacuate and suck from the barrel of an extruder to remove volatile components such as residual monomer, and inject foaming agent, thereby extruding and foaming. Incidentally, it was unexpected that thermoplastic polyester resin foam of high quality free from deterioration of thermoplastic polyester resin can be continuously extruded and foamed by applying this method in recycled thermoplastic polyester resin, without drying process of PET, as the moisture is sufficiently removed by evacuation and suction in the extruder.

OBJECTS AND SUMMARY OF THE INVENTION

It is hence a primary object of the invention to present a continuous manufacturing method of high quality PET foam, by solving the conventional problems, and using the recovered material from a huge quantity of recycled thermoplastic polyester resin containers.

It is other object of the invention to present a continuous manufacturing method of thermoplastic polyester resin foam capable of feeding unfoamed or foamed ground material of recycled thermoplastic polyester resin directly into an extruder.

It is another object of the invention to present an efficient continuous manufacturing method of thermoplastic polyester resin foam capable of removing moisture only by evacuating and sucking from the barrel of an extruder, without a complicated process of drying thermoplastic polyester resin.

It is a different object of the invention to present a continuous manufacturing method of foam being less in deterioration of thermoplastic polyester resin in high temperature extrusion, by removing moisture by evacuating and sucking from the barrel of an extruder.

It is a further object of the invention to present a continuous manufacturing method of thermoplastic polyester resin foam modified in thermoplastic polyester resin deteriorated by addition of crosslinking agent, and improved in foaming property.

It is a further different object of the invention to present a continuous manufacturing apparatus of thermoplastic polyester resin foam for executing the foregoing objects.

To achieve the above objects, the present inventor intensively researched and finally reached this invention.

That is, when fusing and kneading the thermoplastic polyester resin in an extruder, although the thermoplastic polyester resin is increased in its melt viscosity, only by evacuating and sucking from the barrel of the extruder, it was confirmed that the moisture can be sufficiently removed from the thermoplastic polyester resin so as to avoid deterioration. The invention is based on such finding.

The invention therefore provides a continuous method of manufacturing thermoplastic polyester resin foam characterized by adding a crosslinking agent to a thermoplastic polyester resin, feeding into an extruder, fusing and kneading in the extruder to increase the weight-average molecular weight of the resin, evacuating and sucking from the barrel of the extruder to remove moisture from the fused resin, injecting a foaming agent into the fused resin to obtain a formed fused resin, and extruding and foaming it from the extruder into a low pressure region, and a manufacturing apparatus of thermoplastic polyester resin foam comprising an extruder having a vent port in the portion corresponding to the resin fusing section of the barrel, an extruder having a foaming agent pressure feed port on the way of the barrel, a connection tube for coupling these two extruders, an evacuating device consecutive to the vent port, and a die attached to the front end of the extruder.

BRIEF DESCRIPTION OF THE DRAWINGS

FIG. 1 is a schematic sectional view of a foam manufacturing apparatus according to the invention;

FIG. 2 is a schematic sectional view of other foam manufacturing apparatus according to the invention;

DETAILED DESCRIPTION OF THE PREFERRED EMBODIMENTS

Figure 3:
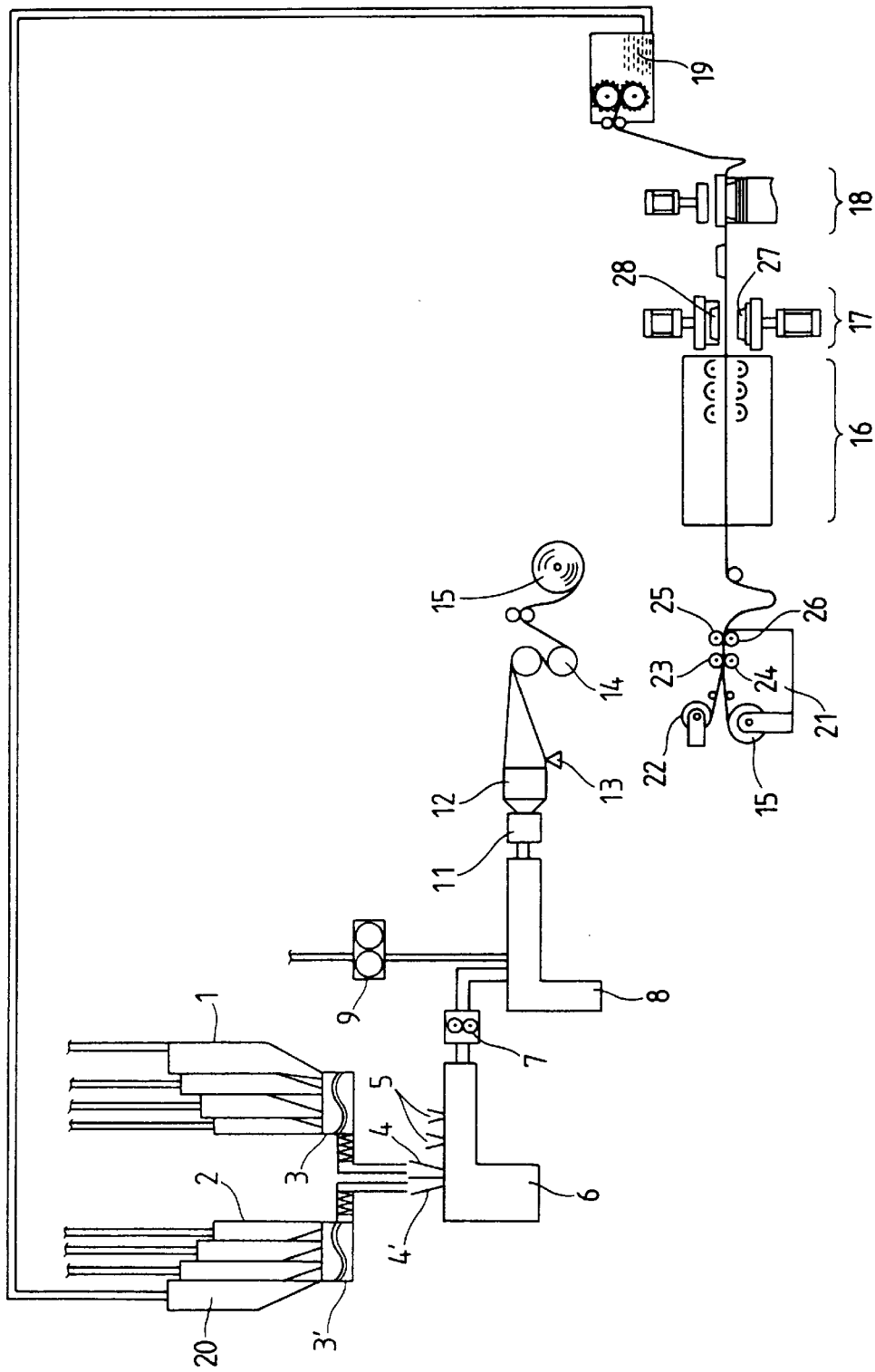
FIG. 3 is a schematic side view of other embodiment of the invention.

The resin used in the invention is thermoplastic polyester resin from fresh material or recovered material. The thermoplastic polyester resin is a linear polyester of high molecular weight formed by ester bonding between aromatic dicarboxylic acid and dihydric alcohol. Examples of dicarboxylic acid for composing the PET include terephthalic acid, isophthalic acid, naphthalene decarboxylate, diphenyl ether decarboxylate, diphenyl sulfone decarboxylate, and diphenoxy ethane decarboxylate, and examples of dihydric alcohol include ethylene glycol, trimethylene glycol, tetramethylene glycol, hexamethylene glycol, and diethylene glycol, and therefore the thermoplastic polyester resin is formed by ester bonding of them. Moreover, during polymerization or after polymerization, thermoplastic polyester resin modified by crosslinking agent or branching agent may be also used.

Among other thermoplastic polyester resins, it is preferred to use polyethylene terephthalate, polybutylene terephthalate, polyethylene naphthalate, polybutylene terephthalate elastomer, amorphous polyester, polycyclohexane terephthalate, and their mixtures.

The recovered materials are ground materials of containers once used as liquid containers for non-sparkling beverage, carbonate beverage, juice, alcohol and cosmetics which were blow formed and occur in quantities, and materials cut with a wrapping film and a film for photograph which have been once used.

They may further include ground materials of trimming loss occurring in manufacture of formed parts by heat forming of thermoplastic polyester resin foamed sheet. In particular, when these ground materials are cut to a size for passing through 15 mm punch hole screen, they can be easily supplied into the extruder.

The recovered materials are varied in distribution of water content and molecular weight as compared with fresh materials, but the invention is capable of removing moisture sufficiently and less than a fixed amount thereof even in such resins.

In the invention, thus, recovered materials, fresh materials and their mixtures are used as the thermoplastic polyester resin. Recovered materials are generally deteriorated, and smaller in molecular weight, and hence low in melt viscosity, and are amorphous. By contrast, fresh materials are generally large in molecular weight and high in melt viscosity. Using these resins, however, in order to bring a melt viscosity suited to foaming, in the invention, a crosslinking agent is generally added to the resin or the molten resin. By adjusting the weight-average molecular weight of the thermoplastic polyester resin to 90,000 to 200,000, the resin can be foamed 3 to 20 times. This crosslinking agent is known to function as the branching agent.

As the crosslinking agent, various known substances can be used. Examples include multifunctional epoxy compound, acid dianhydride having two or more acid anhydride groups in a molecule, oxazoline compound, and multifunctional isocyanate, among others. Among them, from the viewpoint of ease of handling and sanitary aspect for human health, multifunctional epoxy compound and acid dianhydride are preferred, and more preferably acid dianhydride should be used.

Examples of acid dianhydride include pyromellitic acid, naphthalene tetracarboxylic acid anhydride, benzophenone tetracarboxylic acid anhydride, and cyclopentane tetracarboxylic anhydride.

Moreover, the crosslinking agent that can be used in the invention is a compound of acid dianhydride, at least one acid anhydride group of which is divided into two carboxyl group due to ring-opening, or a compound comprising three or more carboxyl groups not containing acid anhydride group. Specific examples are pyromellitic acid, trimellitic acid, tricarballylic acid, trimesic acid, trimesitinic acid, and gallic acid. It was unexpected that the crosslinking action was restored by removing moisture by the extruder. It is valuable that the acid anhydride formed by reaction with moisture with the passing of the time by unpacking these crosslinking agents.

Preferably, such crosslinking agent may be added by 0.01 to 5 parts by weight to 100 parts by weight of thermoplastic polyester resin.

In the case that the crosslinking agent is acid dianhydride or a compound containing three or more of its open-ring forms or carboxyl groups, it is preferred to use it together with a compound of a metal belonging to Group I, II or III of the periodic table. Above all, it is preferred to use a compound of a metal belonging to group I or II. These metal compounds may be either organic or inorganic. In particular, sodium carbonate, potassium carbonate, or lithium carbonate is added by 0.01 to 5 parts by weight to 100 parts by weight of thermoplastic polyester resin.

When using acid dianhydride or a compound containing three or more of its open-ring forms or carboxyl groups as crosslinking agent, it is convenient to employ the concept of foam index to make the thermoplastic polyester resin suited to foaming. The foam index is a value obtained by measuring the rate of hydroxyl end group of all end groups of thermoplastic polyester resin molecule, and intrinsic viscosity. The intrinsic viscosity of thermoplastic polyester resin is determined by, for example, stirring and dissolving 0.300 g of thermoplastic polyester resin in 25 ml of orthochlorophenol at 140° C. for 1 hour, putting this solution in a 35° C. thermostatic oven, measuring the solution viscosity by Ostwald viscometer, and calculating.

On the other hand, the rate of hydroxyl end groups of all end groups of thermoplastic polyester resin is calculated as follows. First, from the intrinsic viscosity, the number-average molecular weight is calculated in the following formula.

$$Mn = \{\text{intrinsic viscosity}/(3.07 \times 10^{-4})\}^{1/0.77},$$

Next, from the value of Mn, the total number of end groups per $10^6$ g of polymer is determined in the following formula.

$$\text{Total number of end groups (eq/T)} = 10^6/Mn \times 2$$

Separately, the number of carboxyl end groups in thermoplastic polyester resin is determined in the following method. In 10 ml of benzyl alcohol, about 100 mg of thermoplastic polyester resin is dissolved at 200° C., the solution is titrated in 1/50 N NaOH/ethanol solution using phenol red as indicator, and the number of carboxyl end groups is calculated. This value is converted into the equivalent number of carboxyl groups per $10^6$ g of polymer. Finally by subtracting the number of carboxyl end groups from the total number of end groups, the number of hydroxyl end groups is determined. Thus, the ratio of hydroxyl end group is determined as number of hydroxyl end group/total number of end groups.

The foam viscosity is obtained as intrinsic viscosity × ratio of number of hydroxyl end groups.

To foam the thermoplastic polyester resin, either the thermoplastic polyester resin of which foam index is 0.4 or more is selected, or the foam index of thermoplastic polyester resin is adjusted to be 0.4 or more.

Incidentally, the foaming property of the thermoplastic polyester resin depends greatly on the weight-average molecular weight Mw. The Mw of independently foaming thermoplastic polyester resin foam superior in extrusion foaming property is increased to a value in the range of 80,000 to 250,000, and preferably 90,000 to 200,000. If less than 80,000, the forming performance is only less than two times, and if exceeding 250,000, melt fracture occurs and the appearance is impaired.

Herein, to determine the weight-average molecular weight Mw, about 5 mg of thermoplastic polyester resin is weighed precisely, and it is dissolved in 1.0 ml mixed solvent of equivalent volume of hexafluoroisopropanol and chloroform, and further diluted in chloroform to make up 10 ml in total, and it is measured by gel permeation chromatograph.

As the extruder, a twin extruder is excellent in biting into irregular ground materials and smooth in kneading with crosslinking agent and others, and hence the extrusion amount is stable. This twin extruder is preferably of the type of two screws engaging with each other, and more preferably the two screws should rotate in the same direction. The ratio of extrusion amount/number of revolutions is preferably 0.28 to 1.67, more preferably 0.33 to 1.43, and most preferably 0.42 to 1.25. In the barrel of the twin extruder, a vent port is opened in the portion exactly in the molten state of thermoplastic polyester resin. The vent port is extended in the width direction of the barrel, about the engaging portion of the two screws, up to nearly right above the center line of the screw axis.

An evacuating device is connected to the vent port. Cutting off the air coming into the vent port from the screw side, by actuating the evacuating device, the vent port is desired to be evacuated to 20 Torr or less, preferably to a strong vacuum state of 10 Torr or less.

Pressure fluctuations should be smaller, 9 Torr or less, or preferably 5 Torr or less.

The resin feed port of the extruder is preferably provided with constant feed means for feeding a constant volume, and a commercial constant feed device may be used. Commercial constant feed devices are designed to control the falling solid matter amount by moving the belt, vibrating the spring, or rotating the screw. Using individual constant feed devices, it is preferred to feed the fresh material of thermoplastic polyester resin, recovered material, and crosslinking agent independently by constant amount, but the thermoplastic polyester resin and crosslinking agent may be premixed, and supplied by one constant feed device.

Ahead of the twin extruder, usually, a single extruder of excellent stable feeding performance is connected by means of a connection tube. At this point of connection, a gear pump may be also provided. Somewhere in the barrel of the single extruder, a foaming agent press-feed port is provided. From the foaming agent press-feed port, the foaming agent is press-fed into the barrel. The screw of the single extruder is preferred to be provided in part with Dulmage screw, pin or other mechanism helpful for dispersing the foaming agent. Besides, to stabilize the extrusion amount, it is preferred that the weighing portion at the front end of the screw is longer, and L/D of the weighing portion, that is, the ratio of its length and diameter is preferred to be 5 or more, preferably 7 or more, and further its stabilizing portion is desired to be of full flight, not varying in pitch and depth.

At the front end of the single extruder, a die of sheet, plate, profile or other shape is attached. The die is provided with linear or annular orifice for extruding the thermoplastic polyester resin in a sheet form. When the orifice is linear, a flat foamed sheet is extruded, and it may be advanced on a flat plate or roll, but in the case of an annular orifice, an annular mandrel is attached to its end, and the thermoplastic polyester resin is held in a cylindrical form and foamed, and cooled, then the cylinder is cut open to spread into a sheet.

Thus obtained foamed sheet may be either formed successively, or once taken up on a roll to let stand for a while, and then formed. Anyway, the foamed sheet is heated and softened in the heating process, and then sequentially pressed to a forming die in the forming process and formed. In the heating process, being put in a heating oven incorporating a plurality of infrared ceramic heaters, the material is heated to over the glass transition temperature of thermoplastic polyester resin (about 70 to 75° C.) and below crystallization temperature (about 130° C.). The forming die in vacuum forming may be either convex die or concave die, but preferably may comprise both. The formed foamed sheet has the portion not formed between the formed pieces, that is, the portion of trimming loss.

The formed sheet is, while maintaining the formed shape, heated over the crystallization temperature (about 130° C.) and below melting point (about 250 to 260° C.) to be fixed thermally, and then put into a trimming device. Herein, by cutting, it is separated into the formed piece and trimming loss. The formed piece is directly discharged as a product.

The trimming loss is then ground. If the trimming loss is an irregular continuous form, it is first cut into short pieces, and obtained short pieces are ground. For grinding, a roll crusher, rod mill, ball mill, hammer mill or the like may be used. The recovered material obtained by passing such thermoplastic polyester resin ground pieces through 15 mmø punch holes is particularly excellent in biting stability in the extruder.

The recovered material from the thermoplastic polyester resin foamed sheet is modified by the crosslinking agent, but, to the contrary, deteriorated by heat and is different in properties from the initial raw material. It is therefore preferred to add a crosslinking agent newly to the recovered material.

Incidentally, the thermoplastic polyester resin foamed sheet may be used in wider applications when processed into laminate foamed sheets by laminating at least one side with non-foamed film, Al or other metal foil, or metal deposition film. Lamination is achieved by fusion by heat, adhesion by adhesive, and co-extrusion by extruder. Usable non-foamed films include thermoplastic polyester resin, polyolefin resin, polyamide resin, polyvinylidene chloride resin, polyacrylonitrile resin, and ethylene-vinyl alcohol copolymer, among others. Since these materials are excellent in gas barrier property, especially steam permeability, and the food preservation is excellent when applied in food containers. The food containers forming laminate foamed sheet using Al or other metal foil completely cut off transfer if the foamed sheet is somewhat contaminated, so that the contained food is not polluted.

In the invention, aside from thermoplastic polyester resin, crosslinking agent, and foaming agent, various additives may be used as required. For example, fine powder of fluoroplastics may be mixed to reinforce. As such fluoroplastics, the following resins are preferred, i.e., Polytetrafluoroethylene, Fluorinated ethylene-propylene copolymer, Tetrafluoroethylene-perfluoroalkoxyethylene copolymer, Polychlorotrifluoroethylene, Ethylenetetrafluoroethylene copolymer, Polyvinylidene fluoride and Polyvinyl fluoride.

Besides, foaming nucleating agent, flame retardant, antistatic agent, antioxidant, ultraviolet ray absorbent, coloring matter and others may be also added. These additives may be easily dispersed uniformly in thermoplastic polyester resin by adding them from the feed port of the twin extruder together with the thermoplastic polyester resin.

As the foaming agent, various known foaming agents can be used. Foaming agents are roughly classified into physical foaming agents and chemical foaming agents, and in particular it is preferred to use physical foaming agents. Physical foaming agents are further classified into inert gas, saturated aliphatic hydrocarbon, saturated alicyclic hydrocarbon, halogenated hydrocarbon, ether, ketone and others, and all of them may be used in the invention. As representative examples, inert gas includes carbon dioxide and nitrogen, saturated aliphatic hydrocarbon includes propane and butane, saturated alicyclic hydrocarbon includes cyclohexane, halogenated hydrocarbon includes methyl chloride, and tetrafluoroethane, ether includes methyl tertiary butyl ether, and ketone includes acetone. They maybe used either alone or in combination.

The apparatus for executing the invention is, for example, schematically shown in structures in FIG. 1 and FIG. 2. In FIG. 1 and FIG. 2, reference numeral 1 is a twin extruder, 2 is a front end of the extruder, that is, the extruder head, 3 is a connection tube, 4 is a single extruder, and 5 is a die. Reference numerals 6, 7 and 8 are constant feed devices, 9 is a thermoplastic polyester resin foam, 11 is a vent port, 12 is a resin feed port or crosslinking agent feed port, 13 is an additive feed port, 14 is a suction pipe, 15 is a vacuum pump, 41 is a foaming agent press-feed port, 42 is a foaming agent feed pipe, and 43 is a foaming agent feed device.

Figure 4:
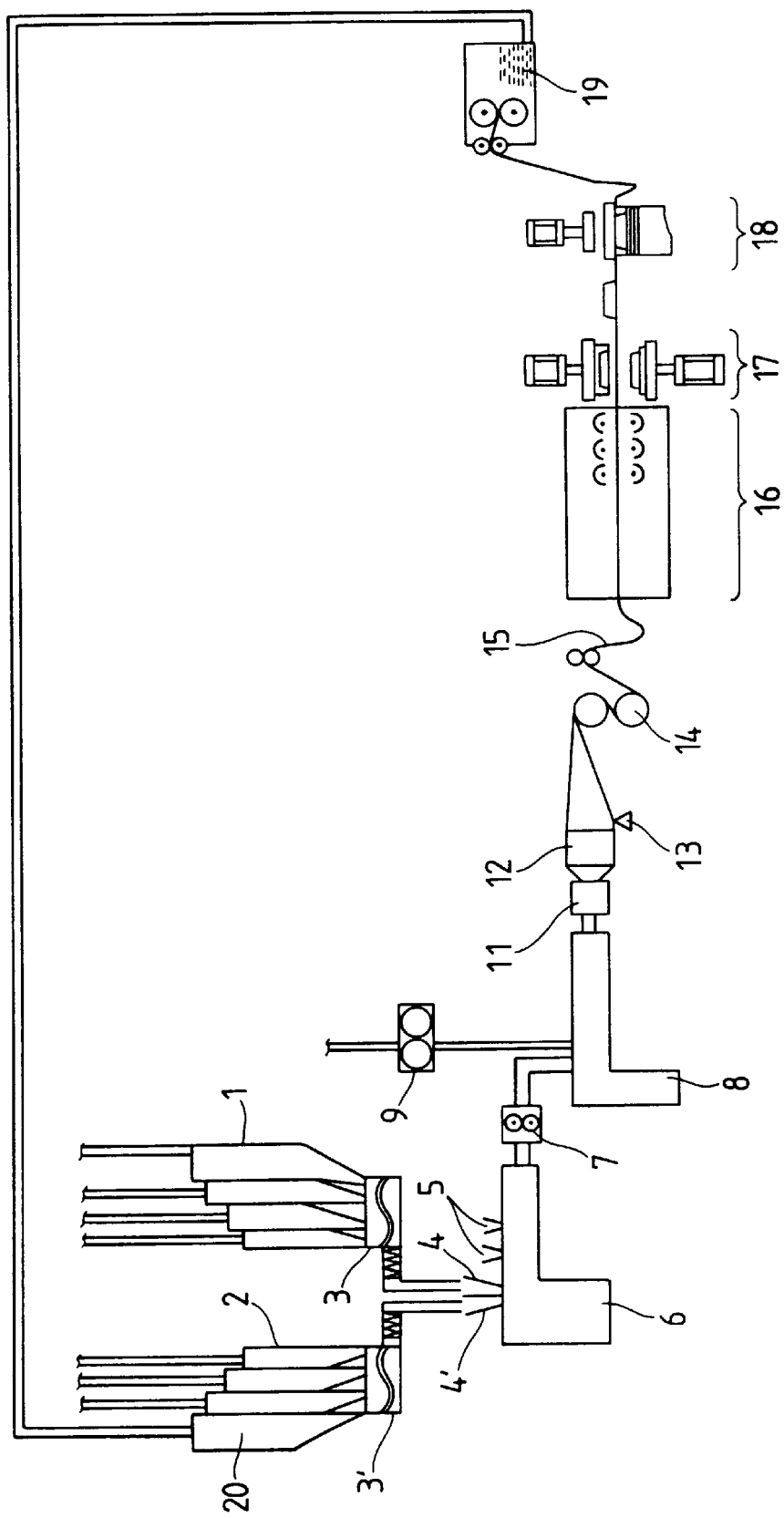
FIG. 4 is a schematic side view of a different embodiment of the invention.

Other embodiments of the invention are schematically shown in FIG. 3 and FIG. 4. In FIG. 3, a fresh material is put into a hopper 1, a recovered material is put into a hopper 20, a crosslinking agent is put into a hopper 2, and they are individually charged into a twin extruder 6 separately from constant feed devices 3 and 3' and through material charge ports 4 and 4'. The twin extruder 6 has two vent ports 5, from which they are sucked in. The thermoplastic polyester resin fused and kneaded in the twin extruder 6 is sent into a second extruder 8 by a gear pump 7, and the foaming agent sent by a pump 9 is press-fed, and is cylindrically extruded from a die 11, cooled on a cylindrical, mandrel 12, and cut by a cutter 13, thereby forming a foamed sheet 15. The foamed sheet 15 is taken up on a take-up roll 14 to be formed into a roll.

The roll is let stand for a while, put into a heat adhesion device 21, and rewound into the foamed sheet 15, and the foamed sheet 15 are glued together with a non-foamed thermoplastic polyester resin film 22, and put into a heating oven 16 to be heated and softened, formed in a forming device 17, and cut into a formed piece and the remainder in a trimming device 18, and ground by a grinder to be fluff 19, which is sent into the hopper 20 to be used again. FIG. 4 shows a nearly same method as in FIG. 3, but FIG. 4 differs from FIG. 3 in that the foamed sheet 15 is not rolled, but is put immediately into the heating oven 16 to be heated.

Thus, according to the invention, the thermoplastic polyester resin of fresh material or recovered material of bulky ground material is supplied into the extruder, and fused and kneaded, and moisture is sucked and removed in vacuum from the barrel of the extruder, and therefore the conventional complicated drying process is not needed. In particular, since the bulky ground material of foam can be directly supplied into the extruder, large dryer is not necessary, and the thermoplastic polyester resin form can be continuously manufactured efficiently. Besides, the thermoplastic polyester resin hardly deteriorates by heat in this process of removing the moisture from the barrel by sucking in vacuum.

Also according to the invention, the thermoplastic polyester resin and crosslinking agent are supplied into the axial extruder, and fused and kneaded in the extruder to increase the weight-average molecular weight of the resin, and the melt viscosity suited to foaming is obtained, while the deteriorated thermoplastic polyester resin is modified, and thermoplastic polyester resin form of high quality and foamed to a high degree can be manufactured continuously.

In the invention, furthermore, when the twin extruder is used, biting is excellent into the ground material of irregular shape, and a constant volume can be extruded, and it is kneaded uniformly with the crosslinking agent, and the extrusion volume is stable, and the thermoplastic polyester resin foam of high quality can be continuously manufactured.

Moreover, in the invention, by using the ground material passing through 15 mm diameter punch holes, biting is further improved, and uniform kneading with the crosslinking is much enhanced.

In the invention, still more, by the method of heating the manufactured foamed sheet either immediately, or once rolling and letting stand for a while, and unwinding into a foamed sheet to be heated, the foamed sheet is softened, and formed by a forming die, and is cut off and divided into the formed piece and the remainder, and the remainder is supplied into the extruder as recovered material by grinding, so that all the rest other than the formed piece can be recovered and formed into a formed piece, and the foaming process and forming process can be executed continuously, so that the manufacturing method is very effective.

Besides, the manufacturing apparatus of the invention is useful in that the method of the invention can be executed easily.

EMBODIMENTS

Presenting some of the embodiments, the benefits of the invention are specifically described below. Hereinafter, the term parts refers to the parts by weight.

Embodiment 1

In this embodiment, the apparatus shown in FIG. 1 was used.

A mixture of 100 parts of recovered material by grinding thermoplastic polyester resin bottle in uncrystallized state with the intrinsic viscosity of 0.65, weight-average molecular weight Mw of 53,200 and foam index of 0.38, 1 part of talk, and 0.05 part of sodium carbonate mixed in a tumbler was charged into a hopper of a constant feed device 6 having a screw feeder, and was continuously supplied into the extruder in the first stage at a rate of 33 kg/hr. A mixture of 100 parts of polyethylene terephthalate of fresh material in uncrystallized state with the intrinsic viscosity of 0.81, Mw of 75,000 and foam index of 0.63, 1 part of talc, 0.05 part of sodium carbonate, and 1.0 part of pyromellitic acid anhydride mixed in a tumbler was charged into a hopper of a constant feed device 7 having a screw feeder, and was continuously supplied into the extruder in the first stage at a rate of 17 kg/hr.

The extruder in the first stage was a twin extruder of engagement type and same rotating direction, with the length of 2400 mm and diameter of screw of 65 mmø. The screw rotating speed of the twin extruder in the first stage was 60 rpm, and the temperature of the extruder cylinder was maintained in a range of 240° C. to 285° C. The screw of the extruder in the second stage was 845 mm (L/D=13) in the length of the weighing portion of extrusion amount, and 216 pins of 5 mm in diameter were planted near the feed port of foaming agent. The moisture in the extruder was removed from the vent port connected to a vacuum pump provided somewhere in the extruder in the first stage. The degree of vacuum at this time was 4.5 Torr. After moisture removal from the extruder in the first stage and viscosity increasing reaction, the molten mixture was supplied into the single extruder 4 having a diameter of the screw of 65 mm and L/D 25 through the connection tube 3 maintained at 275° C.

The screw rotating speed of the extruder in the second stage was 60 rpm, and the temperature of the extruder cylinder was maintained in a range of 265° C. to 275° C. From a middle of the extruder in the second stage, foaming agent (butane) was injected in at a rate of 0.7 part. The molten mixture containing the foaming agent was extruded into the atmosphere through a circular die 5 of aperture 80 mmø and slit width 0.5 mm. The extruded molten resin mixture was foamed and taken up, and was formed in a cylindrical form by a cylindrical mandrel of 205 mmø in diameter and 740 mm in length, and part of the cylindrical foam was cut open, and it was taken up in a sheet form. At this time, cooling water was circulated in the cylindrical mandrel to keep the surface temperature at 25° C.

The obtained foamed sheet had a beautiful appearance with the density of 0.23 g/cc, width of 640 mm, and thickness of 1.5 mm. The Mw of the foamed sheet was 118,000.

After obtaining the sample, while continuing to operate the extruder in the same conditions, the molten resin was taken out from the head of the extruder in the first stage, and the weight-average molecular weight of the removed resin was measured, and the value was 125,000.

Embodiment 2

In this embodiment, the apparatus shown in FIG. 2 was used.

A fresh material of polyethylene terephthalate in uncrystallized sate with the intrinsic viscosity of 0.81, Mw of 75,000 and foam index of 0.639 was charged into a hopper of the constant feed device 6 with screw feeder, and continuously supplied into the extruder in the first stage at a rate of 45 kg/hr. A master batch of polyethylene terephthalate with the intrinsic viscosity of 0.78, Mw of 70,800 and foam index of 0.620, kneading in 10 wt. % of talc, was charged into a hopper of the constant feed device 7 with screw feeder, and continuously supplied into the extruder in the first stage at a rate of 15 kg/hr. A mixture of 15 wt. % of sodium carbonate and 85 wt. % of pyromellitic acid anhydride mixed in a super-mixer was charged into a hopper of a brush type fine powder constant feed device 8, and continuously supplied into the extruder in the first stage at a rate of 33 g/hr.

Thereafter, using the apparatus nearly same as in embodiment 1, manufacturing was conducted in the same conditions.

The obtained foamed sheet had a beautiful appearance with the density of 0.23 g/cc, width of 640 mm, and thickness of 1.5 mm.

After obtaining the sample, while continuing to operate the extruder in the same conditions, the molten resin was taken out from the head of the extruder in the first stage, and the Mw of this resin was 134,000. The Mw of the foamed sheet was 129,000.

Embodiment 3

This embodiment was done in the method shown in FIG. 3.

The twin extruder 6 was of engagement type with a diameter of the screw of 65 mm, and a second extruder 8 was a single extruder with a diameter of the screw of 65 mm.

A mixture of flakes of thermoplastic polyester resin bottle with weight-average molecular weight (Mw) of about 70,000, and ground matter of recovered material of trimming loss after forming at a ratio of 3:2 by weight was continuously supplied into the twin extruder 6 through a material charge port 4' at a rate of about 45 kg/hr from a constant supplying device 3' of recovered material.

Besides, while blending 100 parts of fresh material of polyethylene terephthalate resin (hereinafter called pet) with Mw of about 70,000, 17 parts of pet kneading in 30 wt. % of talc, 2 5parts of pyromellitic acid anhydride, 0.25 part of sodium carbonate, and 0.6 part of pet kneading in 10 wt. % of ethylene tetrafluoride resin powder (Fluon L169J of Asahi Glass Co.), the mixture was continuously supplied into the twin extruder 6 through the material feed port 4 at a rate of 12 kg/hr from the constant supplying device 3.

The barrel length of the twin extruder 6 was 2400 mm, the screw rotating speed was 84 rpm, and the temperature of the extruder cylinder was controlled in a range of 240 to 285° C. From two vent ports 5 provided somewhere in the twin extruder 6, moisture and other volatile matter were removed from the molten resin in the extruder at a degree of vacuum of 4.5 Torr by sucking in vacuum.

By crosslinking in the twin extruder 6 by adding the crosslinking agent, the melt viscosity of the thermoplastic polyester resin was raised, and it was supplied into the single extruder 8. The screw rotating speed of the single extruder 8 was 39 rpm, and the cylinder temperature was controlled in a range of 265 to 275° C., and the foaming agent (n-butane/i-butane=6/4) was implanted from a middle of the cylinder of the extruder 8 by means of the pump 9, and a foaming resin was obtained. This foaming resin was extruded into the atmosphere from an annular orifice with aperture of 80 mm and slit width of 0.5 mm. The extrusion fluctuations at this time were measured 10 times for 3 minutes each, and 2.72% was obtained.

The extruded foaming resin was advanced on the cooling mandrel 12 of 205 mm in diameter while being foamed, and the temperature was lowered from about 200° C. to 65° C. in this process, and was formed in a cylindrical shape. One position of the cylindrical foamed piece was cut open by a cutter 13, and spread into a sheet, and taken up by a take up roll 14, and 300 m was rolled.

The obtained foam had the density of 0.27 g/cc, thickness of 1.43 mm, tensile tear elongation in the extrusion direction of the foamed sheet of 95.3%, that in the width direction of 87.5%, and degree of crystallization of 7%.

The foamed sheet 15 was let stand in a rolled state for 2 weeks. Then this rolled foamed sheet 15 was put in a thermal adhesion device 21, and was unwound, and a non-foamed thermoplastic polyester resin film 22 was adhered to this foamed sheet 15 to obtain a laminate sheet. The non-foamed thermoplastic polyester resin film 22 had a density of 1.3 and thickness of 0.025 mm, and was undrawn, and the side contacting with the foamed sheet was printed in a pattern by a heat resistant ink. The foamed sheet 15 and non-foamed film 22 were glued together by passing through pairs of rolls 23 and 24, and 25 and 26. Of these rolls, the upper roll 23 is heated to 155° C., the lower roll 24 was cooled to 30° C., and the rolls 25 and 26 were both cooled to 25° C. Thus obtained laminate sheet was about 60° C. at the entrance of a heating oven 16.

The heating oven 16 incorporated a plurality of far infrared ceramic heaters in its upper and lower parts. A required area of the laminate sheet was intermittently carried into the heating oven 16. The laminate sheet was heated in the heating oven 16 so that the surface might be 145 to 160° C.

A forming device 17 was a vacuum compressed air forming device consisting of an convex pattern 27 and a concave pattern 28, and each pattern was provided with a heater so as to adjust the die temperature. The convex pattern 27 was designed to feed compressed air at 1 kg/cm$^2$, and the concave pattern 28 was to be evacuated to −600 mmHg. The both patterns were brought closer or apart by a hydraulic device. Each pattern was heated to 180° C.

The laminate sheet sent in between the convex pattern and concave pattern was formed by the vacuum action from the concave pattern 28, and was also formed by the compressed air action from the convex pattern 27. The forming press time was 7 seconds which was the duration required for the degree of crystallization of DSC to reach 17 to 30%. Each pattern was adjusted so as to obtain the formed piece in the following dimensions:

Gratin dish measuring 125 mm×155 mm×30 mm (depth), with wall thickness of 2.0 to 2.5 mm in the bottom and 1.30 to 1.45 mm on the sides.

Thus, the laminate sheet was heated over the glass transition temperature (about 70 to 75° C.) and below crystallization temperature (about 130° C.), and formed, and while maintaining the formed shape, it was then heated over the crystallization temperature and below melting point (about 250 to 260° C.), and was cooled in a cooling die (not shown), and sent into a trimming device 18 to be trimmed, and a heat resistant container of laminated foamed sheet was obtained. At the same time, the scraps formed by trimming were continuously fed into a grinder to be formed into chips for passing through 10 mm punch holes, and recovered material was obtained directly in this form, which was reused by sending into a hopper 20 provided in the upper part of the extruder 6.

Embodiment 4

Using the same extruders 6 and 8 as used in embodiment 3, the method shown in FIG. 4 was executed.

In this embodiment, 0.3 wt. % of pyromellitic acid anhydride was added to pet, and extruded and foamed, and ground material of scraps of the obtained foamed sheet (Mw about 130,000) was continuously supplied into the twin extruder 6 through a charge port 4' at a rate of about 14 kg/hr from a recovered material constant supplying device 3'.

While mixing 100 parts of fresh pet with Mw of about 75,000, 3.5 parts of pet kneading in 30 wt. % of talc, 0.3 part of pyromellitic acid anhydride, 0.05 part of sodium carbonate, and 0.1 part of pet resin kneading in 10 wt. % of ethylene tetrafluoride resin powder (Fluon L169J of Asahi Glass), the mixture was continuously supplied into the twin extruder 6 through the material feed port 4 at a rate of 38 kg/hr from the constant supplying device 3.

The screw rotating speed of the twin extruder 6 was 79 rpm, and the temperature of the extruder cylinder was controlled in a range of 240 to 290° C. From two vent ports provided in the twin extruder 6, moisture and other volatile matter were removed from the molten resin in the extruder by sucking in vacuum at degree of vacuum of 4.5 Torr.

The molten thermoplastic polyester resin crosslinked in the twin extruder 6 was poured into the second extruder 8 by a gear pump 7 rotating at 45 rpm. In the second extruder 8, while controlling the screw rotating speed at 28 rpm and cylinder temperature at 265 to 280° C., about 0.15 part of nitrogen as foaming agent was press-fed into the resin by a pump 9, and a foaming resin was obtained. This foaming resin was extruded into the atmosphere from an annular orifice of 95 mm in aperture and slit width of 0.5 mm.

The extruded foaming sheet was foamed and moved on the cooling mandrel 12 of 205 mm in diameter, and was formed into a cylindrical form by lowering the temperature from about 200° C. to 68° C. One position of the cylindrical form was cut by a cutter 13, and spread into a flat plate, and taken up by a take-up roll 14, and a foamed sheet was obtained. This foamed sheet has the density of 0.36 g/cc, tensile tear elongation of 99.7% in extrusion direction, that of 85.6% in width direction, thickness of 1.02 mm, and degree of crystallization of 8%. This thermoplastic polyester resin foamed sheet was directly put into a heating oven 16 without being taken up, and heated. The heating oven 16 is same as used in embodiment 3. The foamed sheet was 57° C. at the entrance of the heating oven. Transfer into the heating oven 16 was an intermittent moving method. The foamed sheet was heated to a surface temperature of 145 to 160° C.

The thermoplastic polyester resin foamed sheet was then put into a forming device 17. The forming device 17 was same as used in embodiment 3. The convex pattern 27 was designed to supply compressed air of 0.9 kg/cm, the concave pattern was to evacuate at −550 mmHg, and each pattern was heated to 180° C.

The thermoplastic polyester resin foamed sheet was formed by the vacuum action from the concave pattern 28, and was also formed for 7 seconds by the compressed air action from the convex pattern 27, and was formed into a gratin dish in the same size as in embodiment 3. The wall thickness of this container was 0.65 to 0.95 mm in the bottom, and 0.45 to 0.60 mm on the sides.

The foamed sheet was, same as in embodiment 3, heated over the glass transition temperature (about 70 to 75° C.) and below crystallization temperature (about 130° C.), and formed, and while maintaining the formed shape, it was then heated over the crystallization temperature and below melting point (about 250 to 260° C.), and was cooled in a cooling die (not shown), and sent into a trimming device 18 to be trimmed, and a heat resistant container of foamed sheet was obtained. At the same time, the scraps formed by trimming were continuously fed into a grinder, and as chips for passing through 10 mm punch holes, the recovered material was reused by sending into a hopper 20 provided in the upper part of the extruder 6.

Embodiment 5

The embodiment was executed similarly by using the apparatus in embodiment 3, except that the materials of the thermoplastic polyester resin resin and conditions of use of the apparatus were slightly changed. Mainly the changed points are described below.

As the recovered material, a ground matter obtained by grinding thermoplastic polyester resin foamed sheet with the weight-average molecular weight of about 130,000 was put into a recovered material hopper 20 in FIG. 3, and charged into the twin extruder 6 at a rate of about 50 kg/hr.

As the fresh materials, 100 parts of pet kneading in 10 wt. % of talc, 3 parts of pyromellitic acid anhydride, 0.5 part of sodium carbonate, and 1.0 part of thermoplastic polyester resin kneading in 10 wt. % of ethylene tetrafluoride resin powder were blended, and this mixture was charged into the twin extruder 6 at a rate of 5 kg/hr from the hopper 1 in FIG. 3.

The twin extruder 6 rotated the screw at a rate of 80 rpm, and the cylinder temperature was controlled in a range of 230 to 290° C. By sucking at degree of vacuum of 5.0 Torr from two vent ports provided in the twin extruder 6, volatile matter in the molten thermoplastic polyester resin was removed.

Thus fused thermoplastic polyester resin was supplied into a single extruder 8 by a gear pump 7 rotating at 44 rpm. In the single extruder 8, rotating the screw at a rate of 27 rpm, the cylinder temperature was controlled in a range of 265 to 285° C., and the foaming agent (n-butane/i-butane= 4/6) was injected into the thermoplastic polyester resin at a rate of 0.55 part by a foaming agent injection pump 9, and a foaming thermoplastic polyester resin was obtained.

This foaming thermoplastic polyester resin was extruded into the atmosphere from an annular slit of aperture of 80 mm and width of 0.4 mm. The extrusion fluctuations were measured 10 times for 3 minutes each, and 2.91% was obtained. The extruded thermoplastic polyester resin was foamed and advanced along the cooling mandrel of 205 mm in diameter, and was cooled from about 200° C. to 70° C., and a cylindrical form was obtained. The cylindrical form was cut at one position by a cutter 13, and spread into a sheet, and taken up on a take-up roll 14, and was rolled in a length of 300 m.

The obtained foamed sheet had the density of 0.35 g/cm$^3$, tensile tear elongation of 98.2% in the extrusion direction, that of 86.5% in the width direction, thickness of 1.00 mm, and degree of crystallization of 7%.

One month later, the thermoplastic polyester resin foamed sheet was formed into a gratin dish in the same manner as in embodiment 3. Thus obtained container had a thickness of 0.97 to 1.35 mm in the bottom, and 0.65 to 0.88 mm on the sides. Scraps after cutting out the container were ground and reused same as in embodiment 3. By thus recycling the scraps, the thermoplastic polyester resin was used completely without discarding any portion.

Embodiment 6

In this embodiment, using a tandem extruder, a twin extruder rotting in same direction of engagement type of aperture of 65 mmø was used as the extruder in the first stage, and a single extruder with aperture of 65 mmø and L/D of 25 was used as the extruder in the second stage.

First, 100 parts of recovered flakes of thermoplastic polyester resin bottle with intrinsic viscosity of 0.70 and Mw of 70,000 was continuously supplied from the material charge port of the extruder in the first stage at a rate of 66 kg/hr from a material constant supplying device having a screw feeder. A mixture of 100 parts of fresh polyethylene terephthalate resin with intrinsic viscosity of 1.10, 3 parts of talc, and 1.0 part of pyromellitic acid anhydride unpacked 377 days before mixed in a tumbler was continuously supplied into the extruder in the first stage from other material feed port at a rate of 34 kg/hr from the material constant supplying device with screw feeder. The cylinder barrel of the extruder in the first stage was a continuously linked structure of 12 barrel units of 200 mm in length. The screw rotating speed of the twin extruder in the first stage was 120 rpm, and the temperature of the extruder cylinder was maintained in a range of 240 to 285° C. From two vent ports (opening area 12 cm$^2$ each) connected to the vacuum pump in the midst of the extruder in the first stage, moisture in the extruder was removed. At this time, the degree of vacuum was 4.5 Torr.

After removing the moisture in the extruder in the first stage and performing viscosity increasing reaction, the molten mixture was supplied into the single extruder in the second stage through a connection tube maintained at 275° C. The screw rotating speed of the extruder in the second stage was 65 rpm, and the temperature of the extruder cylinder was maintained in a range of 265 to 275° C. Besides, from a middle of the extruder in the second stage, 0.7 part of foaming agent (butane) was injected. The molten mixture containing the foaming agent was extruded into the atmosphere from a circular die of aperture of 80 mmø and slit width of 0.5 mm. The extruded molten resin mixture was foamed and taken up, and formed into a cylindrical shape by a cylindrical mandrel of 330 mmø in diameter and 740 mm in length, and part of the cylindrical foam was cut open, and taken up as sheet. At this time, cooling water was circulated in the cylindrical mandrel, and the surface temperature was kept at 25° C. The obtained foamed sheet had the density of 0.23 g/cc, width of 1040 mm, and thickness of 1.0 mm.

Embodiment 7

In this embodiment, the same tandem extruder as in embodiment 6 was used.

A mixture of 100 parts of polyethylene terephthalate resin with intrinsic viscosity of 0.81 and Mw of 75,000, 1 part of talc, and 0.05 part of sodium carbonate mixed in a tumbler was continuously supplied from a material charge port of an-extruder in the first stage at a rate of 30 kg/hr from a material supplying device with a screw feeder. A mixture of 100 parts of polyethylene terephthalate resin with intrinsic viscosity of 0.81 and Mw of 75,000, 1 part of talc, 0.05 part of sodium carbonate, and 1.0 part of pyromellitic acid mixed in a tumbler was continuously supplied into the extruder in the first stage from other material feed port at a rate of 20 kg/hr from the material constant supplying device with screw feeder. The screw rotating speed of the twin extruder in the first stage was 120 rpm, and the temperature of the extruder cylinder was maintained in a range of 240 to 285° C. From two vent ports (opening area 12 cm$^2$ each) connected to the vacuum pump in the midst of the extruder in the first stage, moisture in the extruder was removed. At this time, the degree of vacuum was 4.1 Torr. After removing the moisture in the extruder in the first stage and performing viscosity increasing reaction, the molten mixture was supplied into the single extruder in the second stage through a connection tube maintained at 275° C. The screw rotating speed of the extruder in the second stage was 33 rpm, and the temperature of the extruder cylinder was maintained in a range of 265 to 275° C. Besides, from a middle of the extruder in the second stage, 1.2 parts of foaming agent (butane) was injected. The molten mixture containing the foaming agent was extruded into the atmosphere from a multi-nozzle opening having a total of 312 nozzles, consisting of three rows with 104 nozzles in each row, with the hole diameter of 1.2 mm, lateral pitch of 2.8 mm, and vertical pitch of 6.0 mm. The extruded foam was immediately advanced while keeping close to the sizing die (thickness 18 mm×length 300 mm) controlled at 60° C. in contact with the die. Using this sizing die, polyethylene terephthalate foam with a wood grain appearance, adhering mutual strands without gap, having the density of 0.15 g/cc, width of 300 mm and thickness of 18 mm was obtained.

Embodiment 8

In this embodiment, the same tandem extruder as in embodiment 6 was used.

A mixture of 100 parts of polyethylene-2,6-naphthalate resin with intrinsic viscosity of 0.55 and Mw of 42,300, 1 part of talc, and 0.05 part. of sodium carbonate mixed in a tumbler was continuously supplied from a material charge port of an extruder in the first stage at a rate of 60 kg/hr from a material supplying device with a screw feeder. A mixture of 100 parts of polyethylene-2,6-naphthalate resin with intrinsic viscosity of 0.55, 1 part of talc, 0.05 part of sodium carbonate, and 1.3 parts of trimellitic acid mixed in a tumbler was continuously supplied into the extruder in the first stage from other material feed port at a rate of 40 kg/hr from the material constant supplying device with screw feeder. The screw rotating speed of the twin extruder in the first stage was 120 rpm, and the temperature of the extruder cylinder was maintained in a range of 255 to 290° C. From two vent ports (opening area 12 cm² each) connected to the vacuum pump in the midst of the extruder in the first stage, moisture in the extruder was removed. At this time, the degree of vacuum was 4.3 Torr.

After removing the moisture in the extruder in the first stage and performing viscosity increasing reaction, the molten mixture was supplied into the single extruder in the second stage through a connection tube maintained at 275° C. The screw rotating speed of the extruder in the second stage was 64 rpm, and the temperature of the extruder cylinder was maintained at 280° C. Besides, from a middle of the extruder in the second stage, 0.9 part of foaming agent (butane) was injected. The molten mixture containing the foaming agent was extruded into the atmosphere from a circular die with aperture of 80 mmø and slit width of 0.5 mm. The extruded molten resin mixture was foamed and taken up, and formed into a cylindrical shape by a cylindrical mandrel of 330 mmø in diameter and 740 mm in length, and part of the cylindrical foam was cut open, and taken up as sheet. At this time, cooling water was circulated in the cylindrical mandrel, and the surface temperature was kept at 25° C. The obtained foamed sheet had the density of 0.20 g/cm³, width of 1040 mm, and thickness of 1.0 mm.

Comparison 1

This example was executed in the same manner as in embodiment 6, except that the thermoplastic polyester resin used in embodiment 6 was used by drying with a dehumidifying dryer, and that it was not evacuated and sucked by the extruder in the first stage.

To dry the thermoplastic polyester resin, air with dew point of −50° C. was circulated, and drying was performed for 5 hours at 160° C.

The molten mixture containing the foaming agent was extruded from a circular die of aperture of 80 mmø and slit width of 0.5 mm at a rate of 100 kg/hr, but the foaming agent and resin were intermittently discharged from the die, and foamed sheet could not be obtained.

Comparison 2

This example was executed in the same manner as in embodiment 7, except that the thermoplastic polyester resin used in embodiment 7 was used by drying preliminarily in the same conditions as in comparison 1, and that it was not evacuated and sucked by the extruder in the first stage.

The molten mixture containing the foaming agent was extruded at a rate of 50 kg/hr, but the foaming agent and resin were intermittently discharged from the die, only foam with density of 0.68 g/cm³ poor in appearance and having many pores was obtained. The Mw of the foam was 78,000.

Comparison 3

This example was executed in the same manner as in embodiment 3, except that the thermoplastic polyester resin used in embodiment 8 was used by drying preliminarily in the same conditions as in comparison 1, and that it was not evacuated and sucked by the extruder in the first stage.

The molten mixture containing the foaming agent was extruded at a rate of 100 kg/hr, but the foaming agent and resin were intermittently discharged from the die, and foamed sheet could not be obtained.

What is claimed is:

1. A method for manufacturing thermoplastic polyester resin foam comprising:
    a melting and kneading step for melting and kneading a composition comprising at least one moisture-containing thermoplastic polyester resin in a first stage comprising an extruder comprising at least one twin screw,
    a moisture removing step for removing moisture in the molten resin by venting said molten resin under vacuum from said first stage,
    a foaming agent infecting step for infecting a foaming agent into the dehumidified molten resin to modify the resin into a foaming molten resin in a second stage, and
    an extrusion foaming step for extruding and foaming the foaming molten resin into a low pressure region,
    wherein the composition comprising the thermoplastic polyester resin further comprises a fluoroplastic.

2. A method for manufacturing thermoplastic polyester resin foam comprising:
    a melting and kneading step for melting and kneading a composition comprising at least one moisture-containing thermoplastic polyester resin and a fluoroplastic,
    a moisture removing step for removing moisture in the molten resin by venting said molten resin under vacuum,
    a foaming agent injecting step for injecting a foaming agent into the dehumidified molten resin to modify the resin into a foaming molten resin, and
    an extrusion foaming step for extruding and foaming the foaming molten resin into a low pressure region.

3. A method for manufacturing thermoplastic polyester resin foam as recited in claim 2, wherein the molten and kneaded thermoplastic polyester resin is crosslinked to increase the weight-average molecular weight of the thermoplastic polyester resin.

4. A method for manufacturing thermoplastic polyester resin foam as recited in claim 3, wherein the foaming molten resin is foamed more than three times, and the weight-average molecular weight of the foam is increased in the range of 80,000 to 250,000.

5. A method for manufacturing thermoplastic polyester resin foam as recited in claim 2, wherein the shape of the extruded foaming resin is in the form of a sheet, plate or board.

6. A method for manufacturing thermoplastic polyester resin foam as recited in claim 2, wherein the melting and kneading step and moisture removing step are carried out by a twin screw extruder, and the foaming agent injecting step and extrusion foaming step are carried out by a single screw extruder.

7. A method for manufacturing thermoplastic polyester resin foam as recited in claim 2, wherein the moisture removing step is performed by applying a pressure of 20 Torr or less.

8. A method for manufacturing thermoplastic polyester resin foam as recited in claim 2, wherein the thermoplastic polyester resin is either a fresh material or a recovered material.

9. A method for manufacturing thermoplastic polyester resin foam as recited in claim 8, wherein the recovered material is foamed or unfoamed ground material.

10. A method for manufacturing thermoplastic polyester resin foam as recited in claim 9, wherein the ground material is of a size passing through 15 mm diameter punch holes.

11. A method for manufacturing thermoplastic polyester resin foam as recited in claim 2, wherein the thermoplastic polyester resin is a mixture of fresh material and recovered material.

12. A method for manufacturing thermoplastic polyester resin foam as recited in claim 6, wherein at least part of said thermoplastic polyester resin comprises recovered material of foamed or unfoamed ground material.

13. A method for manufacturing thermoplastic polyester resin foam as recited in claim 2, wherein a crosslinking agent is added to the thermoplastic polyester resin before or during the melting and kneading step.

14. A method for manufacturing thermoplastic polyester resin foam as recited in claim 2, wherein said fluoroplastic is polytetrafluoroethylene resin.

15. A method for manufacturing thermoplastic polyester resin foam as recited in claim 2, further comprising:

a forming step for forming the foam extruded and foamed in the extrusion foaming step into a formed piece of a specific shape, a cutting step for cutting off a trimming loss portion of said formed piece, a grinding and recovering step for grinding the trimming loss portion and collecting as recovered material, and a recovered material feedback step for feeding back the recovered material into the melting and kneading step.

16. A method for manufacturing thermoplastic polyester resin foam product, comprising:

a melting and kneading step for melting and kneading a composition comprising at least one moisture-containing thermoplastic polyester resin and a fluoroplastic, a moisture removing step for removing moisture in the molten resin by venting said molten resin under vacuum, a foaming agent infecting step for injecting a foaming agent into the dehumidified molten resin to modify the resin into a foaming molten resin, an extrusion foaming step for extruding and foaming the foaming molten resin into a low pressure region to obtain a foam, and a film laminating step for laminating the foam with a film.

17. A method for manufacturing thermoplastic polyester resin foam as recited in claim 16, wherein at least a portion of the thermoplastic polyester resin comprises recovered material, and said thermoplastic polyester resin is crosslinked in the melting and kneading step to increase the weight-average molecular weight of the thermoplastic polyester resin, and the foam extruded and foamed in the extrusion foaming step is laminated with a film of fresh material or a metal foil.

18. A method for manufacturing thermoplastic polyester resin foam as recited in claim 17, wherein the foam laminated with the film or metal foil is formed into a specific shape.

* * * * *